Dec. 13, 1932.  G. S. NEELEY  1,891,005
METHOD OF AND MEANS FOR PREVENTING SCALING, CORROSION,
OR LIKE ACTION IN METALLIC BODIES
Filed Feb. 4, 1931

Inventor:
George S. Neeley
by his Attorneys
Howson & Howson

Patented Dec. 13, 1932

1,891,005

UNITED STATES PATENT OFFICE

GEORGE S. NEELEY, OF HARTFORD, ILLINOIS, ASSIGNOR OF ONE-HALF TO GRIFFIN WATKINS, OF ALTON, ILLINOIS

METHOD OF AND MEANS FOR PREVENTING SCALING, CORROSION, OR LIKE ACTION IN METALLIC BODIES

Application filed February 4, 1931. Serial No. 513,405.

This invention relates to methods of and means for stopping undesired electrolytic action in metallic bodies containing liquid, such as boilers or the like. It is now well known that such action is due to self-generated currents within such bodies and that it causes corrosion, scaling, pitting and other objectionable and destructive action therein.

The present invention is a continuation in part of the invention disclosed in my prior co-pending application, Serial No. 385,149, filed Aug. 12, 1929. As pointed out in that application, the internal self-generated currents in metallic bodies which are accountable for the destructive action are apparently of thermo-electric origin, the internal metallic surfaces of the body acting as a cathode and the heated central area of the hot liquid within the body acting as an anode. The temperature difference apparently causes a thermocouple action which sets up the undesired current flow. In accordance with my prior invention, I propose to eliminate all electrolytic action within a metallic body by applying an external electromotive force to the body which opposes and counteracts the internal force which sets up the detrimental currents. Thus, by suitably adjusting the external force applied to the body and constantly maintaining the adjustment at a proper value, I am enabled to obtain and continuously maintain an exact statical balance of forces within the body, thereby completely stopping all current flow within the body. While it appears logical that the method constitutes a counterbalancing of electromotive forces, it is possible that other forces, such as electromagnetic forces, are involved, as pointed out in my prior application.

The internal self-generated currents in boilers or like bodies usually vary in amplitude due to the varying operating conditions to which the modern boiler is subjected. That is, the varying operating conditions of the boiler cause varying internal forces to be set up therein, which forces in turn set up the varying currents. According to the method and system of my prior invention, it is necessary to adjust or vary the applied external force manually to maintain an exact statical balance of forces if the internal forces of the body vary. According to my present invention, the same general method is carried out by means of a system operating according to the same principle as that of my prior invention. However, in the present instance, the exact statical balance of forces is maintained automatically at all times. In one embodiment of the present invention, any unbalancing of the opposing forces renders effective compensating means which functions to bring the forces back into a statical balanced condition again. In accordance with an alternative embodiment of the present invention, a constant applied external force is automatically maintained to balance the internal forces within the metallic body where the operating conditions of the particular body are relatively constant and the detrimental action may be counteracted by means of a constant external force.

The primary object of the present invention is therefore to provide an efficient method of and means for automatically maintaining a statical balance of forces in the metallic body to be protected, thereby eliminating entirely any error due to the human element involved in a manual system, such as that disclosed in my aforesaid application.

A more specific object of the invention is to provide means actuated by a variation of either of the opposing forces to vary the external applied force in such a manner as to maintain an exact balance of the opposing forces at all times.

A further object of the invention is to provide a method of and means for automatically applying an external force of constant magnitude to the body to be protected.

The above and other objects and features of the invention will be more clearly apparent hereinafter. Reference may be had to the following detailed description in connection with the accompanying drawing for a complete disclosure of the structural features and operation of the invention.

Figure 1:
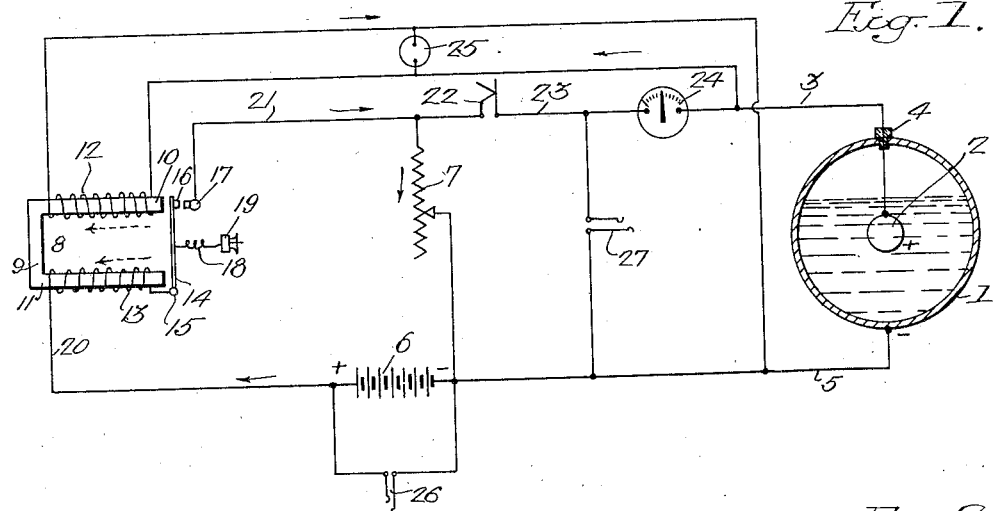
Fig. 1 is a schematic wiring diagram of the preferred embodiment of my invention, wherein automatic regulation of varying forces is obtained.

Referring to Fig. 1 of the drawing, there is disclosed in section a body 1, which may be any body adapted to contain heated liquid, such as a boiler or the like. In order to set up an opposing force within the body to counteract the above referred to inherent forces therein, I provide a centrally disposed electrode 2 which is adapted to constitute an anode and may therefore be composed of any suitable metal adapted to that end. An external conductor 3 may be connected to electrode 2 in any suitable manner, such as by a soldered joint or the like. An insulating bushing 4 is provided in the shell of body 1 through which conductor 3 may pass and be electrically insulated from the boiler shell. The centrally disposed electrode may, of course, be supported within the metallic body in any suitable manner. A second external conductor 5, which constitutes the other side of the external circuit, has one end connected to the outside surface of the shell of body 1. Such connection may also be made in any suitable manner.

In accordance with the present invention, and also in accordance with the general principle of my prior invention mentioned above, I apply a suitable electromotive force to body 1 by means of a suitable source of uni-directional potential 6. This source may comprise an ordinary battery. Since the potentials involved are of such minute character, dry cells may be used to constitute source 6. The negative terminal of source 6 may be connected to the shell of body 1 by means of conductor 5, while the positive terminal of the source is adapted to be connected through conductor 3 to the positive electrode 2 within body 1. A variable resistor 7 may be connected across the external circuit, by means of which varying potentials may be applied to the metallic body. Resistor 7 then merely acts as a shunt path of variable resistance, the potential drop thereacross being applied to body 1. Obviously, a potentiometer could be used instead but would give no control of the current from source 6. Thus far, the system described is similar to that of my prior application, and in that system, varying electromotive forces may be applied to the metallic body by manually adjusting a potentiometer which takes the place of resistor 7 in the present system.

In accordance with the present invention, I provide a differential relay device 8 which is adapted to automatically vary the external applied electromotive force in accordance with variations of the opposing forces which would otherwise cause an unbalanced condition. This device may comprise a U-shaped magnet 9 having extending parallel poles 10 and 11, upon which windings 12 and 13 are wound respectively. The device may also comprise a pivoted armature 14, which may be pivoted at one end as at 15 and may carry at its opposite end a suitable contact 16. A stationary contact 17 is provided for cooperation with contact 16, as will appear more clearly hereinafter. A biasing spring 18 having a suitable nut 19 may be attached to armature 14 to normally maintain contacts 16 and 17 in predetermined relation. It will be understood, of course, that any other suitable biasing means may be provided for the pivoted armature. Contacts 16 and 17 are preferably platinum but may be any other suitable conducting material.

The positive terminal of source 6 may be connected to one extremity of winding 13 by means of conductor 20, while the other extremity of the winding may be connected to armature 14 at the pivot point 15. Stationary contact 17 may be connected by means of conductor 21 to one contact of a normally closed jack 22, whose other contact is connected to conductor 23. The conductors 3 and 23 may be connected to a suitable milliameter 24, to be described later. The second winding 12 of relay device 8 is wound upon pole 10 in opposite direction to that of winding 13. The extremities of this winding are connected to conductors 3 and 5, respectively, thereby shunting the winding directly across body 1, and its internal current generating force. A suitable millivolt meter 25 may also be shunted across the body to indicate the potential existing thereacross at any instance. In order to provide for the measuring of the various potentials and currents in the system, jacks 26 and 27 may also be provided, the former being normally open and connected in parallel with source 6, while the latter is also normally open and connected across resistor 7. The various jacks of the system may be grouped and mounted in a single box-like structure.

Considering the operation of the system and the method carried out thereby, it will be readily apparent that if contacts 16 and 17 are closed, a current will flow through resistor 7 from source 6, the direction of current in this closed circuit will be as indicated by the arrows in Fig. 1. The potential across the effective portion of resistor 7, which is applied to the metallic body 1 is, of course, the voltage drop across the effective portion due to the flow of current therethrough. The polarity of this external potential is such as to oppose the internal forces causing the currents within body 1. Initially resistor 7 is adjusted to its zero value and contacts 16 and 17 are allowed to open by loosening adjusting nut 19. Milliameter 24 is then connected directly across body 1 and indicates the value of the internal thermo-electric current. In other words we have short-circuited the internal current through the meter. Resistor 7 may now be adjusted to decrease the current until the meter reads approximately 20 milliamperes. Adjusting nut 19 may now be tightened to just close contacts 16 and 17. The current flow through winding 13 will set up a magnetic field in magnet 9, the direction of lines of force or flux of such field being indicated by the lower-broken-line arrow. The magnetic field will, of course, attract armature 14 against the action of spring 18 and thereby tend to separate contacts 16 and 17. Current flow through winding 12 in the direction of the arrows will set up an opposing magnetic field in the magnet, the direction of such field being indicated by the upper broken line arrow. This opposing field will aid the tension of spring 18 in its action upon the armature. In operation, the resultant vibration of the armature, opening and closing the contacts, determines the current flow through the circuit of resistor 7. This current flow will result in a certain potential drop across the effective portion of resistor 7 and the application of that potential to the metallic body 1. Adjusting nut 19 is now adjusted to obtain a statical balance of forces, within body 1, which will be indicated by a zero reading on meter 24.

Device 8 functions to automatically vary the value of applied external force by varying the current flow through resistor 7 in accordance with any variation in the internal forces and currents within body 1. Assuming that the external force has been initially adjusted as just described to obtain a statical balance of forces within the body, if the internal forces within the body vary thus tending to set up resultant current flow therein, the variation will cause a variation in the potential across winding 12. Such variation in potential will result in a proportionate current variation through winding 12 and a corresponding variation in its magnetic field with a consequent variation of the ratio of vibration of the armature and contact. If, for example, the internal forces within body 1 decreased, the decreased current flow through winding 12 would be equivalent to a decrease in tension of spring 18 which would cause opening of contacts 16 and 17, thereby decreasing the rate of vibration of the armature and decreasing the current flow through the circuit to decrease the applied electromotive force to body 1 until it is exactly equal to the internal forces and a statical balance is again obtained. An increase in the internal forces will cause an increase in applied electromotive force in the same manner. Thus a balance of forces is automatically maintained.

It is important to note that device 8 is also rendered effective whenever the voltage of source 6 varies to maintain a constant applied electromotive force to body 1. While the external electromotive force would normally remain constant, any variation therein is compensated by means of device 8. Thus, if the current flow from source 6 should gradually lessen due to the wearing out of the battery, or like device, the resulting decrease in the magnetic field of winding 13 will allow contact 16 to move toward contact 17 and thus increase the rate of vibration of the armature to increase the current through resistor 7 and maintain the electromotive force applied to body 1 constant. This action is important because it enables the use of the battery without manual adjustment during its entire useful life and avoids premature replacement thereof.

Another important feature in connection with device 8 which should be noted is the fact that the wearing of the contacts of such device due to arcing is substantially eliminated. In practice contact 16 has a tendency to vibrate too rapidly and it is well known that the rapid opening and closing of current carrying contacts will cause injurious arcing. However, in the present device, since winding 12 is always included in a closed circuit it functions to oppose rapid changes in the magnetic field of winding 13 by building up a sustaining field, thereby opposing any rapid variation as would cause arcing between contacts of the device.

Figure 3:
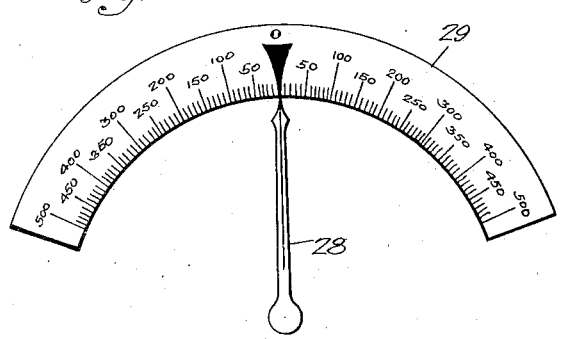
Fig. 3 is a detail view of the face or scale of the balance-indicating instrument used in the systems of Figs. 1 and 2.

In the system just described, it is desirable to provide a double scale milliameter 24 for indicating any current flow and direction of such flow in the external circuit. This device may be similar to the one disclosed and described in my prior application and is disclosed herein in Fig. 3. With an exact balanced condition of opposing forces, the indicating pointer 28 of the device will take up a position adjacent the zero mark on the scale 29. Any unbalancing of the opposing forces will result in the pointer moving to the left or right depending upon which of the opposing forces is greater and the resultant direction of flow of the current.

While the system of my invention functions primarily to completely stop electrolytic action within a metallic body, I have found that it also enables the obtaining of secondary results or functions which are of a highly desirable nature and almost as important as the primary object. I have found that the maintaining of an exact statical balance between the opposing forces eliminates foaming and priming which is so prevalent in locomotive boilers. This action is probably due to the fact that the objectionable internal currents cause a clogging action which hinders or prevents circulation of the liquid within the body. When such currents are eliminated, free circulation is allowed and the objectionable foaming and priming is eliminated. It is, of course, possible that some other explanation may be given for the result which is obtained. Regardless of the explanation, however, it is readily apparent that the elimination of foaming and priming is a very desirable result, since foaming and priming causes inefficient operation of the boiler and accessories, and oftentimes results in disastrous explosions. This inherent action also causes the carrying of the scale from the boiler to the cylinders, thereby resulting in abrasive wear of the cylinder walls and piston rings. Therefore, the stopping of this action results in a saving due to longer life of such surfaces.

It is also important to note that the stopping of electrolytic action and scale results in a great saving in coal. Since the scale which would otherwise be formed is heat resisting and acts as a heat insulator, the boiler and its accessories require a greater amount of heat to obtain the desired temperature of the water. With the scale and its inherent insulating properties removed, however, maximum heat is obtained from fuel, thereby resulting in more efficient operation.

Figure 2:
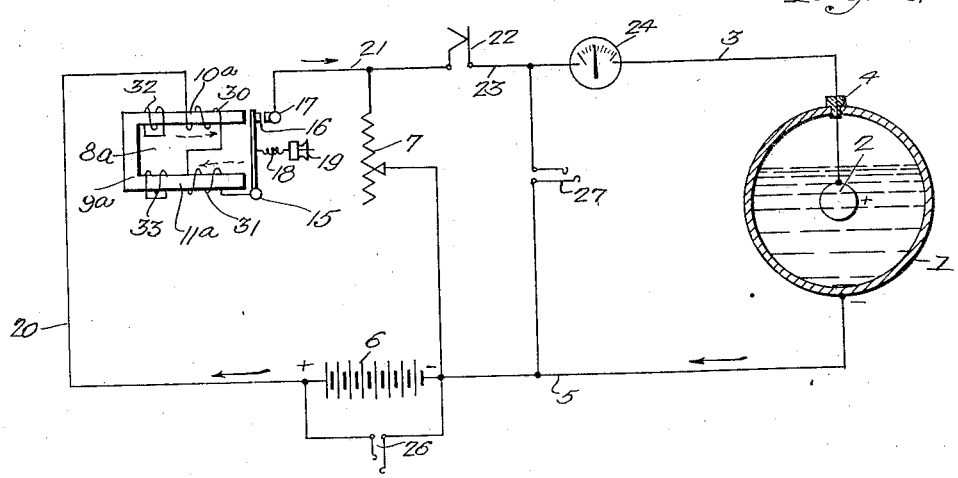
Fig. 2 is a schematic wiring diagram of an alternative embodiment of the invention which enables the application of a constant external force to the body to be protected.

In Fig. 2, there is disclosed a modified form of system, in which a constant external electromotive force may be applied to metallic body 1. This system is similar in principle of operation to that of Fig. 1 described above, but a device 8a of different construction and function is substituted for device 8. This device 8a also comprises a U-shaped magnet 9a having extending poles 10a, and 11a. A pair of serially connected windings 30 and 31 are disposed respectively on arms 10a and 11a. The free terminal of winding 30 may be connected to the positive terminal of source 6, while the free end of winding 31 is connected to pivot point 15 of the armature. A second pair of short-circuited windings 32 and 33 are also disposed upon arms 10a and 11a respectively. Winding 32 may be wound in the same direction as winding 31, while 33 takes the same direction as winding 31. The purpose of these short-circuited windings is to prevent rapid changes in the magnetic field set up in magnet 9a. While these windings have been illustrated as independent short-circuited windings, they may be connected together in series or parallel and may be wound over or under their adjacent windings on their respective magnet arms. The only requisite of the device is that a short-circuited circuit be inductively associated with the actuating windings 30 and 31.

In instances where the operating characteristics and conditions of a boiler or like body are practically constant, and the internal forces causing the internal currents are, therefore, likewise constant, the system of Fig. 2 may be used to great advantage. In operation, resistor 7 of this system and spring 18 are adjusted in the manner previously described to initially provide an opposing external electromotive force which exactly neutralizes the internal forces within body 1. The statical balance will, of course, be indicated by milliameter 24. Should the current flow from source 6 decrease for any reason, such, for example, as the wearing out of the battery, a decrease in the magnetic field of windings 30 and 31 will result. Spring 18 will then function to increase the rate of vibration of the armature to maintain the current through resistor 7 and maintain a constant electromotive force applied to body 1. In order to prevent arcing at the contacts, the present modification utilizes windings 32 and 33. Any rapid change in the magnetic field of windings 30 and 31 will cause electromotive forces to be inducted across the auxiliary windings and a current flow therethrough will result. This current flow will, in turn, set up a magnetic field to add to or sustain that of windings 30 and 31. The system of the modification just described enables the use of a battery as the source of external potential for a longer period of time than would otherwise be possible. Normally, the weakening condition of the battery would necessitate manual adjustment or premature replacement of the battery, since its voltage would be insufficient to obtain a balance of forces.

From the foregoing description, it will be apparent that the methods and systems contemplated by the present invention, particularly, the method and system of Fig. 1, perform a highly desirable result in a novel manner. The value of automatic control of the statical balance of the opposing forces can readily be visualized from the fact that the errors involved when the human element is present may be quite considerable. Since a manual system requires the constant attention of an operator, the system also, therefore, results in a saving in operation costs.

While I have disclosed herein two embodiments of my invention, it will be understood that various changes in the details of either or both of the systems may be made without departing from the spirit of the invention. Obviously the number of turns of the various windings and their arrangement may be varied in any suitable manner as long as the desired functions are carried out. The disclosure illustrates the principles of the invention only and any suitable design or structure of the elements of the systems are contemplated herein. Only such limitations as are necessarily imposed by the appended claims in view of the prior art are to be placed upon the invention.

I claim:

1. A method of stopping undesired electrolytic action in a heated fluid-containing metallic body caused by current flow set up by forces within said body, which consists in opposing said forces with an external force of sufficient magnitude to obtain a statical balance of forces, whereby current flow within said body is prevented, and utilizing variations of said external force to control said external force, whereby the statical balance of forces is automatically maintained.

2. A method of stopping undesired electrolytic action in a heated fluid-containing metallic body caused by a varying current flow set up by varying forces within said body, which consists in opposing said forces with an external force of sufficient magnitude to obtain a statical balance of forces, whereby current flow within said body is prevented, and utilizing variations of said varying forces to control said external force, whereby the statical balance of forces is automatically maintained as long as said body is in operation.

3. A method of stopping undesired electrolytic action in a heated fluid-containing metallic body caused by a varying current flow set up by varying forces within said body, which consists in opposing said forces with an external variable force of sufficient magnitude to obtain a statical balance of forces, whereby current flow within said body is prevented, and utilizing variations of said varying and variable forces to control said variable force, whereby the statical balance of forces is maintained as long as said body is in operation.

4. A system for stopping undesired electrolytic action in a heated fluid-containing metallic body caused by current flow set up by forces within said body, which comprises means for applying an opposing external force to said body of sufficient magnitude to cause a statical balance of forces, whereby current flow within said body is prevented, and means controlled by variations of said external force for controlling said external force, whereby the statical balance of forces is automatically maintained.

5. A system for stopping undesired electrolytic action in a heated fluid-containing metallic body caused by a varying current flow set up by varying forces within said body, which comprise means for applying an opposing external force to said body of sufficient magnitude to cause a statical balance of forces, whereby current flow within said body is prevented, and means controlled by variations of said varying forces for controlling said external force, whereby the statical balance of forces is automatically maintained as long as said body is in operation.

6. A system for stopping undesired electrolytic action in a heated fluid containing metallic body caused by a varying current flow set up by varying forces within said body, which comprises means for applying an opposing external variable force to said body of sufficient magnitude to cause a statical balance of forces, whereby current flow within said body is prevented, and means controlled by variations of said varying and variable forces for controlling said variable force, whereby the statical balance of forces is maintained as long as said body is in operation.

7. A system for stopping undesired electrolytic action in a heated fluid-containing metallic body caused by current flow set up by forces within said body, which comprises a source of electromotive force, a variable resistor in series with said source and connected to said body so that the drop in potential across the effective portion of the resistor is applied to said body in opposition to said internal force, whereby a statical balance of opposed forces may be obtained to prevent current flow within said body, and a control device comprising a magnet, a spring biased vibratable armature, relatively movable contacts controlled by said armature, and an energizing winding on said magnet, said winding and said contacts being connected in series with said source and said resistor, whereby variations of the electromotive force of said source render said control device effective to vary the current flow through said resistor so as to maintain the statical balance of forces.

8. A system for stopping undesired electrolytic action in a heated fluid-containing metallic body caused by current flow set up by forces within said body, which comprises a source of electromotive force, a variable resistor in series with said source and connected to said body so that the drop in potential across the effective portion of the resistor is applied to said body in opposition to said internal force whereby a statical balance of opposed forces may be obtained to prevent current flow within said body, and a control device comprising a magnet, a spring biased vibratable armature, relatively movable contacts controlled by said armature, and an energizing winding and a short circuited winding on said magnet, said energizing winding and said contacts being connected in series with said source and said resistor, wherby variations of the electromotive force of said source render said control device effective to vary the current flow through said resistor so as to maintain the statical balance of forces, and said short circuited winding opposes rapid changes in the magnetic field of said energizing winding.

9. A system for stopping undesired electrolytic action in a heated fluid-containing metallic body caused by current flow set up by forces within said body, which comprises a source of electromotive force, a variable resistor in series with said source and connected to said body so that the drop in potential across the effective portion of the resistor is applied to said body in opposition to said internal force, whereby a statical balance of opposed forces may be obtained to prevent current flow within said body, and a control device comprising a magnet, a spring biased vibratable armature, relatively movable contacts controlled by said armature, and a pair of opposed energizing windings on said magnet, one of said windings and said contacts being connected in series with said source and said resistor, the other of said windings being connected in parallel with said resistor and said body, whereby variations of said internal force or of the electromotive force of said source render said control device effective to vary the current flow through said resistor so as to maintain the statical balance of forces.

GEORGE S. NEELEY.